US011975989B2

(12) United States Patent
Hu et al.

(10) Patent No.: US 11,975,989 B2
(45) Date of Patent: May 7, 2024

(54) INTEGRATED METHOD FOR CLEARANCE, COLLECTION AND CAPTURE OF INTERNAL POLLUTANTS AND ALGAE IN A SURFACE LAYER OF THE LAKE BOTTOM

(71) Applicant: NANJING INSTITUTE OF GEOGRAPHY & LIMNOLOGY. CHINESE ACADEMY OF SCIENCES, Nanjing (CN)

(72) Inventors: Weiping Hu, Nanjing (CN); Yihui Zhang, Nanjing (CN); Jiancai Deng, Nanjing (CN); Weiwei Xu, Nanjing (CN)

(73) Assignee: NANJING INSTITUTE OF GEOGRAPHY & LIMNOLOGY, CHINESE ACADEMY OF SCIENCES, Nanjing (CN)

( * ) Notice: Subject to any disclaimer, the term of this patent is extended or adjusted under 35 U.S.C. 154(b) by 180 days.

(21) Appl. No.: 17/094,835

(22) Filed: Nov. 11, 2020

(65) Prior Publication Data

US 2021/0309538 A1  Oct. 7, 2021

(30) Foreign Application Priority Data

Apr. 1, 2020 (CN) .......................... 202010249879.9

(51) Int. Cl.
*C02F 1/00* (2023.01)
*A01K 63/10* (2017.01)
(Continued)

(52) U.S. Cl.
CPC .............. *C02F 1/008* (2013.01); *A01K 63/10* (2017.01); *E02B 3/023* (2013.01);
(Continued)

(58) Field of Classification Search
CPC ................ C02F 1/008; C02F 2001/007; C02F 2101/105; C02F 2101/16; C02F 2101/30;
(Continued)

(56) References Cited

U.S. PATENT DOCUMENTS 4,839,051 A * 6/1989 Higa ........................ C02F 3/046
210/170.07
2020/0063388 A1* 2/2020 Rodriguez Larreta . C02F 3/327
(Continued)

FOREIGN PATENT DOCUMENTS

CN           1505722 A  *  6/2004  ............. B01D 21/24
CN         105625269 A  *  6/2016  ............... E02B 5/02
(Continued)

OTHER PUBLICATIONS

Hu_A_vertical_compressed_three_dimensional_ecological_model_in_Lake_Taihu_China_NPL.pdf (Year: 2005).*
(Continued)

*Primary Examiner* — Ekandra S. Miller-Cruz
(74) *Attorney, Agent, or Firm* — PROI Intellectual Property US; Klaus Michael Schmid

(57) ABSTRACT

An integrated method for clearance, collection and capture of internal pollutants and algae at the bottom of a lake include the following steps: selecting areas where the pollution level is high, and organic or inorganic particulate matter is prone to accumulation and carrying out trenching operations at the bottom of the lake to form a plurality of traps; and removing the sludge and algae inside the traps and clearing the sediment inside the traps, for subsequent internal pollution control when the surface-layer sludge on both sides of the traps almost fills up the traps. This method makes use of the hydrodynamic disturbances of waves formed by natural wind energy and lake currents to continuously transport sludge with a high pollution level and a
(Continued)

small specific gravity and algae in the surface layer of the lake bottom, which are rich in organic debris, to artificially built traps.

5 Claims, 1 Drawing Sheet

(51) Int. Cl.
| | |
|---|---|
| *C02F 101/10* | (2006.01) |
| *C02F 101/16* | (2006.01) |
| *C02F 101/30* | (2006.01) |
| *C02F 103/00* | (2006.01) |
| *E02B 3/02* | (2006.01) |

(52) U.S. Cl.
CPC .. *C02F 2001/007* (2013.01); *C02F 2101/105* (2013.01); *C02F 2101/16* (2013.01); *C02F 2101/30* (2013.01); *C02F 2103/007* (2013.01); *C02F 2209/42* (2013.01)

(58) Field of Classification Search
CPC ............ C02F 2103/007; C02F 2209/42; C02F 2101/34; C02F 2101/38; C02F 11/00; C02F 11/004; C02F 11/12; C02F 11/121; C02F 11/128; C02F 11/16; A01K 63/10; E02B 3/023; E02B 1/00; E02B 3/00; E02B 3/02; E02B 2201/00; Y02A 10/00
USPC ......................................................... 210/744
See application file for complete search history.

(56) References Cited

U.S. PATENT DOCUMENTS

| | | | |
|---|---|---|---|
| 2020/0071897 A1* | 3/2020 | Parker | E02F 9/2054 |
| 2022/0198303 A1* | 6/2022 | Ito | G06N 5/022 |

FOREIGN PATENT DOCUMENTS

| | | | | |
|---|---|---|---|---|
| CN | 106745692 A | * | 5/2017 | ............ C02F 101/30 |
| KR | 20060125311 A | * | 12/2006 | ................ C02F 1/00 |

OTHER PUBLICATIONS

Wave_Energy_and_Wave_Changes_with_Depth_manoa.hawaii.edu_ExploringOurFluidEarth_NPL.pdf (Year: 2022).*
Shallow_definition_NPL.pdf (Year: 2022).*
JP_2004162309_A_M.pdf (Year: 2004).*
Translation of CN_106745692_A (Year: 2017).*
Translation of Kim_KR20060125311A (Year: 2006).*
Translation of Tom_CN1505722A (Year: 2004).*
Weiping Hu et al., 2006, "A vertical-compressed three-dimensional ecological model in Lake Taihu, China", Ecol. Model. 109(3), 367-398.

* cited by examiner

INTEGRATED METHOD FOR CLEARANCE, COLLECTION AND CAPTURE OF INTERNAL POLLUTANTS AND ALGAE IN A SURFACE LAYER OF THE LAKE BOTTOM

TECHNICAL FIELD

The present invention pertains to the field of internal pollution control in lakes and specifically relates to integrated clearance, collection and capture of pollutants and algae in lake bottom surface sediments.

BACKGROUND ART

At present, a popular method for removing sludge, algae and light pollutants in lakes is sediment dredging. Re-suspended sludge, algae and pollutants with a small specific gravity are easily moved under hydrodynamic action and transported to the dredged area, which reduces the dredging effect. Dredging operations are affected by changes in waves and water level, so it is difficult to control the thickness of the dredged sediment and the phenomenon of over-thick dredging often occurs, increasing the workload of sediment dredging. Therefore, a sediment yard with a large area and a large capacity is needed. In addition, dredging will destroy the lake bottom sediment ecosystem. The mollusc snails, shellfish, mussels and microbial communities in the sediment as well as aquatic vegetation will be damaged to varying degrees, which is not conducive to the lake bottom ecosystem to maintain its ability to purify pollutants. Although ecological dredging can control dredging depth well to a certain extent, the water content in the polluted sediment from dredging is relatively high, and flocculants need to be added in the sediment yard for dehydration and the tail water will also form secondary pollution. In addition, the dredging operations require a large area and are costly and inefficient.

SUMMARY OF THE INVENTION

In order to overcome the defects of existing technology for internal pollution control, the present invention provides an integrated method for clearance, collection and capture of pollutants and algae in lake bottom surface sediments. The present invention builds certain sediment capture traps at the bottom of the lake mainly taking advantage of the feature that the surface sediment of shallow lake rich in pollutants is prone to re-suspension and transport under hydrodynamic action, and achieves the function of collection by taking advantage of the clearing effect of hydrodynamic force, the weak power inside the sediment capture traps and the feature that particulate sediment keeps being deposited and compacted in the traps to remove water. When the foregoing clearing and collection functions are maintained, only the compacted sediment with less water inside the traps needs to be removed, so the operation area is small, the sediment volume is small, the cost is low, the efficiency is high, the impact on the lake bottom ecosystem is small and no sediment yard with a large area and a large capacity is needed.

In order to achieve the foregoing object, the present invention adopts the following technical solution:

An integrated method for clearance, collection and capture of internal pollutants and algae in a surface layer of the lake bottom, comprising the following steps:

(1) Selecting areas where the pollution level is high, and organic or inorganic particulate matter (including algae particles, algae in particular) is prone to accumulation and building deep concave traps at the bottom of the lake in the accumulation-prone areas to form a plurality of traps collecting pollutants and algae at the bottom of the lake; and (2) Removing the sludge and algae inside the traps and clearing the sediment in the traps, for subsequent internal pollution control when surface-layer sludge (with a high content of pollutants and algae particles or algae) on both sides of the traps almost fills up the traps.

The accumulation-prone areas at the step (1) are the convergence areas of lake currents at the bottom or the peripheral areas of the estuary.

In each of the accumulation-prone areas at the step (1), there are a plurality of high-frequency convergence points and the trap is a straight line or a curve connecting the plurality of high-frequency convergence points.

The high-frequency convergence points at the step (1) are determined through the following steps:

(1.1) Collecting data including the wind speed, wind direction, river mouth positions entering or leaving the lake, discharge, water depth, current direction and shear stress at the lake bottom;

(1.2) According to the collected data, using a three-dimensional hydraulic model to calculate the lake flow field and wind wave for typical year, analyzing calculation results of the daily average or hourly average lake current at lake bottom and determining the frequency and distribution of the convergence points, among which the convergence points with an annual frequency of more than 25% are high-frequency convergence points.

The calculation method of convergence points is an existing technology.

The depth of the trap is determined according to the wavelength in the accumulation-prone area, the water depth of the trap bottom (i.e., distance from the trap bottom to the lake surface) is more than half of wavelength of highest one-tenth wave in the typical year and the height difference between the trap bottom and the lake bottom is more than 1 m.

The convergence zones are zones that conform to $$\frac{\partial u}{\partial x} + \frac{\partial v}{\partial y} < 0,$$

where u and v are velocity components in an east-west direction and a south-north direction at the bottom of the lake respectively, and x and y are the east-west and south-north coordinates of the lake.

The traps at the step (2) are used for collecting and enriching sludge in the surface layer of the lake bottom, containing pollutants and algae particles, algae and muddy sediment in particular.

For areas where the lake bottom is not hard soil, the step (2) further comprises protecting the edges of the formed traps.

The edge protection material is concrete, metal plate, engineering plastic plate or any other material with high strength.

The lake is a shallow lake with a water depth of less than 6 m at a normal water level and with a relatively flat bottom.

The shape of the traps at the step (2) is belt-shaped, the length is 0.6 to 0.9 time the length of the bottom convergence zones and the width is 4 to 20 m.

The present invention has the following beneficial effects:

Trenching at the bottom of the lake can change the water flow dynamics and form a still water environment at the bottom of the lake, thereby capturing the sludge and algae that carry internal pollutants, further improving the bottom water quality of a large shallow lake under the effects of waves, controlling the growth of algae at the bottom of the lake and achieving stable and continuous removal of internal pollution and algae at the bottom of the lake.

The method provided by the present invention can make use of the hydrodynamic disturbance of waves formed by natural wind energy to continuously transport sludge with a high pollution level and a small specific gravity and algae on the surface of the lake bottom, which are rich in organic debris, to artificially built traps. Sediment physically settles to the trap bottom, which has a deep water and weak hydrodynamic disturbances, and is covered layer by layer and gradually compacted, so that the amount of the sludge and algae around the traps at the bottom of the lake is continuously reduced, thereby achieving the purpose of internal pollution control and algae removal.

This method has a low cost and a high efficiency. In the later salvage process, only the traps need to be salvaged to achieve the enrichment and removal of pollutants in the entire area without operation of the entire area, greatly saving labor cost.

DETAILED DESCRIPTION

Embodiment 1

Figure 1:
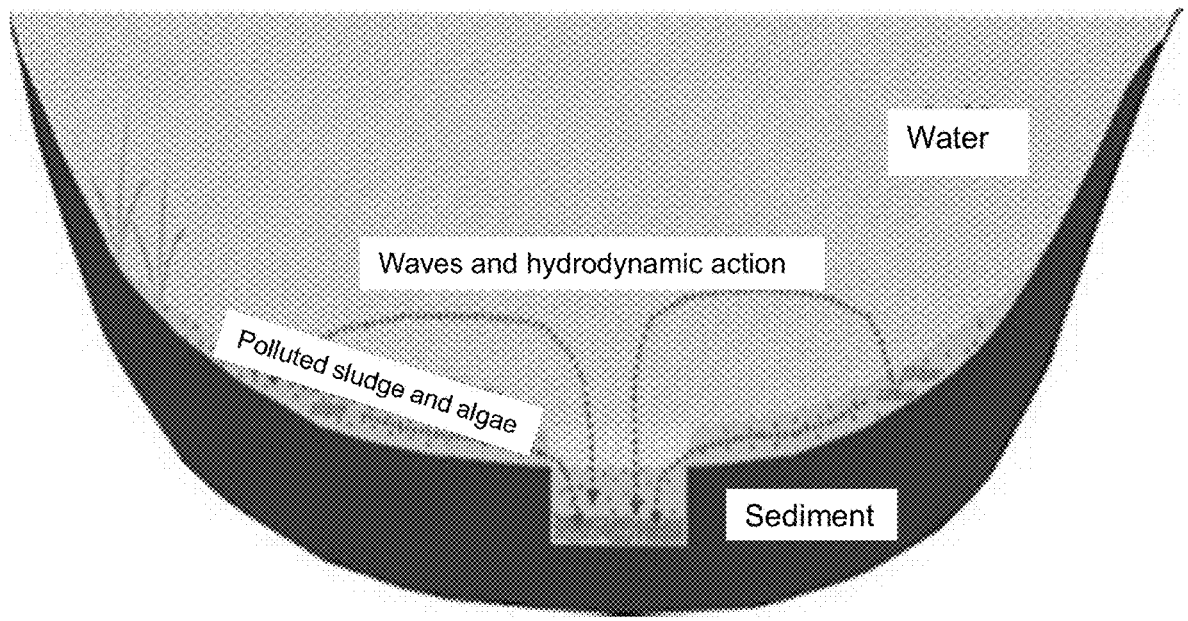
FIG. 1 is schematic diagram of the present invention.
Figure 2:
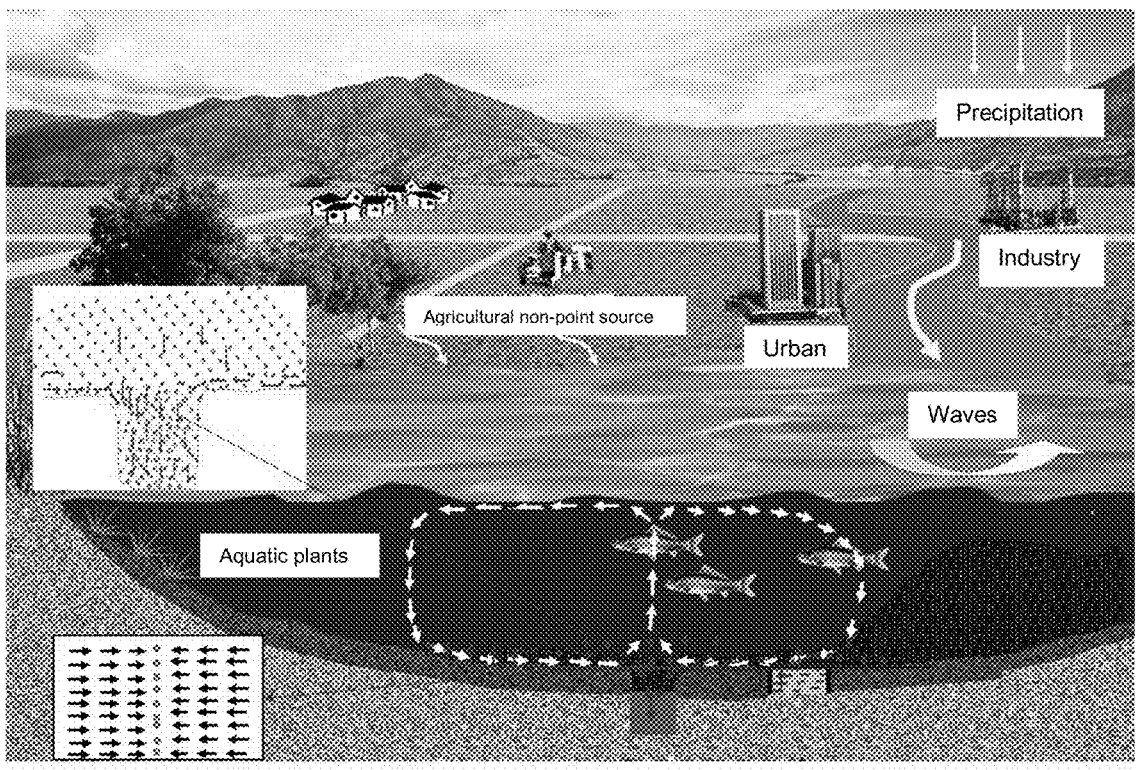
FIG. 2 is schematic diagram of the present invention.

In the Zhushan Lake area where sludge pollutants and algae of the Taihu Lake are prone to accumulation and precipitation, the zones that conform to $$\frac{\partial u}{\partial x} + \frac{\partial v}{\partial y} < 0$$

are selected as convergence zones, the wind velocity, wind direction, lake current flow direction and lake bottom shear stress of the zones are investigated, the lake flow field and wave value in a typical year are calculated using a three-dimensional hydrodynamic model according to the method in the prior art (reference: Hu, W., Jorgensen, S. E., Zhang, F., 2006. A vertical-compressed three-dimensional ecological model in Lake Taihu, China. Ecol. Model. 190(3), 367-398.) and the calculation results of daily average or hourly average bottom-layer flow field are analyzed to determine the frequency and distribution of convergence points of the bottom-layer flow field and determine that the convergence points with an annual frequency of above 25% are high-frequency convergence points.

Trenching operations are conducted at the bottom of the lake to form a plurality of traps at the bottom of the lake. The traps randomly connect a plurality of high-frequency convergence points and are 4 m wide, 2 m deep and 0.6-0.9 time as long as the convergence zones. The water depth of the trap bottom is 7 m (more than half of wavelength of highest one-tenth wave in the typical year).

Meanwhile, engineering plastic plates are used to protect the edges of the traps.

12 months later, after the polluted sludge and algae in the water settle in the traps through water current action, the sludge and algae inside the traps are collected and removed using shipborne dredging equipment.

After this technology is used, the total nitrogen and total phosphorus contents in the surface layer of the sediment are reduced by 40% and the content of chlorophyll a is reduced by 50%.

What is claimed is:

1. An integrated method for clearance, collection and capture of organic or inorganic particulate matter pollutants and algae in a surface layer of a bottom of a lake having a main body, wherein the method comprises the following steps: (1) selecting accumulation-prone areas where the pollutants are prone to accumulation and building a plurality of deep concave traps at the bottom of the lake in the accumulation-prone areas to collect pollutants and algae at the bottom of the lake; and (2) removing the pollutants and the algae inside the traps for pollution control when the pollutants on both sides of the traps fills up the traps; wherein the accumulation-prone areas at the step (1) are convergence areas of lake currents at the bottom of the lake or peripheral areas of an estuary; wherein in each of the accumulation-prone areas at the step (1), there are a plurality of high-frequency convergence points and the trap is a straight line or a curve connecting the plurality of high-frequency convergence points, wherein the high-frequency convergence points are determined through the following steps: (1.1) collecting data including wind speed, wind direction, river mouth positions entering or leaving the lake, discharge, water depth, current direction and shear stress at the lake bottom; (1.2) according to the collected data, using a three-dimensional hydraulic model to calculate a lake flow field and wind wave for a year, analyzing calculation results of a daily average or hourly average lake current at the bottom of the lake and determining the frequency and distribution of convergence points, among which the convergence points with an annual frequency of more than 25% are high-frequency convergence points; wherein each of the traps vertically extend into the main body establishing an upper boundary and a lower boundary, along with an inner section and an outer section, wherein the inner section is configured to collect the pollutants, wherein the outer section adjoins to the main body of the lake on one side, forming a contiguous boundary with the lake, and the outer section is bordered by water on another side; and the depth of the trap itself from the upper boundary to the lower boundary of the trap is more than 1 meter; and wherein the vertical extension of the trap is designed to interact with waves and hydrodynamic action to guide the pollutants into the inner section.

2. The method according to claim 1, wherein the step (1) further comprises protecting edges of the traps.

3. The method according to claim 2, wherein an edge protection material is concrete, metal plate or engineering plastic plate.

4. The method according to claim 1, wherein the depth of the lake is less than 6 meters at a normal water level.

5. The method according to claim 1, each of the traps having a length and a width, the width of the traps is 4 to 20 meters.

* * * * *